United States Patent
Kim et al.

(10) Patent No.: US 10,311,319 B2
(45) Date of Patent: Jun. 4, 2019

(54) SYSTEM AND METHOD FOR RECOGNIZING VEHICLE LICENSE PLATE INFORMATION

(71) Applicant: ELECTRONICS AND TELECOMMUNICATIONS RESEARCH INSTITUTE, Daejeon (KR)

(72) Inventors: Pyong Kun Kim, Daejeon (KR); Hyun Woo Kang, Daegu (KR); Kwang Ju Kim, Gyeongju-si (KR); Jong Taek Lee, Daegu (KR); Kil Taek Lim, Daegu (KR); Yun Su Chung, Daegu (KR); Byung Gil Han, Daegu (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 16 days.

(21) Appl. No.: 15/598,414

(22) Filed: May 18, 2017

(65) Prior Publication Data

US 2018/0121744 A1 May 3, 2018

(30) Foreign Application Priority Data

Oct. 31, 2016 (KR) ........................ 10-2016-0142974

(51) Int. Cl.
*G06K 9/00* (2006.01)
*G06K 9/32* (2006.01)
*G06K 9/03* (2006.01)

(52) U.S. Cl.
CPC ............. *G06K 9/325* (2013.01); *G06K 9/036* (2013.01); *G06K 2209/15* (2013.01)

(58) Field of Classification Search
CPC ..... G06K 9/325; G06K 9/036; G06K 2209/15
See application file for complete search history.

(56) References Cited

U.S. PATENT DOCUMENTS

| | | | |
|---|---|---|---|
| 2012/0057756 A1* | 3/2012 | Yoon | G06K 9/3258 382/104 |
| 2013/0148857 A1 | 6/2013 | Yoon et al. | |
| 2014/0355835 A1* | 12/2014 | Rodriguez-Serrano | G06K 9/72 382/105 |
| 2018/0189588 A1* | 7/2018 | Ahn | G06K 9/32 |

FOREIGN PATENT DOCUMENTS

| | | |
|---|---|---|
| JP | 2010-073051 A | 4/2010 |
| KR | 10-2003-0038013 A | 5/2003 |
| KR | 10-2007-0113334 A | 11/2007 |

(Continued)

*Primary Examiner* — Amara Abdi
(74) *Attorney, Agent, or Firm* — Rabin & Berdo, P.C.

(57) ABSTRACT

Provided is a technology for recognizing vehicle license plate information which includes detecting a position of a license plate from a vehicle image obtained by imaging a vehicle, extracting individual character images by separating a plurality of characters from a region of the detected license plate in the vehicle image and extracting a license plate type of the license plate according to a predetermined criterion, recognizing a license plate character string on the basis of the extracted individual character images and the license plate type and outputting the recognized license plate character string.

13 Claims, 4 Drawing Sheets

(56) References Cited

FOREIGN PATENT DOCUMENTS

| | | | | |
|---|---|---|---|---|
| KR | 20070113334 | * | 11/2007 | ............. G06K 9/342 |
| KR | 10-0802605 | | 2/2008 | |
| KR | 10-2010-0083966 A | | 7/2010 | |
| KR | 10-1182173 B1 | | 9/2012 | |
| KR | 10-2013-0105952 A | | 9/2013 | |
| KR | 10-1468566 B1 | | 12/2014 | |
| KR | 10-1496390 B1 | | 2/2015 | |
| KR | 10-2015-0094165 A | | 8/2015 | |
| KR | 10-2016-0058421 A | | 5/2016 | |

\* cited by examiner

| TYPE | USAGE CHARACTER |
|---|---|
| TYPE 1 | 어, 버, 서, 저, 마 |
| TYPE 2 | 아, 바, 사, 자, 배 |
| TYPE 3 | 아, 바, 자 |
| TYPE 4 | 어, 버, 저 |
| TYPE 5 | 바 |
| TYPE 6 | 마 |
| TYPE 7 | 그, 느, 르, 므, 즈 |
| TYPE 8 | 구, 누, 루, 무, 주 |

SYSTEM AND METHOD FOR RECOGNIZING VEHICLE LICENSE PLATE INFORMATION

CROSS-REFERENCE TO RELATED APPLICATION

This application claims priority to and the benefit of Korean Patent Application No. 2016-0142974, filed on Oct. 31, 2016, the disclosure of which is incorporated herein by reference in its entirety.

BACKGROUND

1. Field of the Invention

The present invention relates to a character recognition technology, and more particularly, a system and method for recognizing information of a vehicle license plate.

2. Discussion of Related Art

A vehicle license plate recognition technology is a technology that automatically recognizes character string information of a license plate attached to a vehicle from an image, that is, a core technology widely used in speed control, parking lot administration, road toll collection, and security closed-circuit television (CCTV).

Generally, acquiring character information of a vehicle license plate requires three steps of processing, including license plate detection, character separation, and character recognition. In the license plate detection, a position of a license plate is roughly estimated, in the character separation, positions of individual characters are accurately estimated, and in the character recognition, the individual characters are recognized on the basis of the estimated positions.

According to a method of recognizing a vehicle license plate, a position of a license plate is roughly detected from an image of a vehicle, and from the detected position of the license plate, a position of each character of the license plate and a license plate type are determined. Then, a license plate character image is extracted from position information of each character so that a character string of the license plate is reconstructed.

In the case of license plate detection, the position of the license plate is detected by analyzing an image, but a region of interest (ROI) may be provided in advance as in a parking lot entrance, or a position of a vehicle may be provided by an external sensor (e.g., a loop sensor) as in speed control so that the license plate detection can be achieved.

In the case of character separation, a position of each character is estimated by analyzing a whole image, and position information of each character is obtained by extracting edge information of each character or a license plate using histogram smoothing, vertical/horizontal projection, template, binarization, and the like. Among vehicle license plate recognition related technologies, the character separation is the most actively developed technology, and the license plate type is determined mainly in the character separation.

In the case of character information recognition, a license plate character string is constructed by processing license plate type information and individual character images, which are determined in the character separation, through a type-specific recognizer. In this case, a recognizer corresponding to a license plate type among type-specific recognizers is selected and applied so that individual characters are recognized. Character information recognition is mainly achieved by a method of comparing a character image stored in a template scheme or a method of training a recognizer with learning data through a neural network.

In this regard, a technology is disclosed in Korean Patent Registration Publication No. 10-0802605 (title: Apparatus and Method of Recognizing Numerals from Vehicle License Plate) including a camera configured to capture an image of a license plate of a vehicle; a binary processing unit configured to convert a gray level of a pixel of the image of the license plate of the vehicle that is output from the camera into a binary value such that a gray level that is higher than or equal to a predetermined value is converted into a binary value corresponding to white and a gray level that is lower than the predetermined value is converted into a binary value corresponding to black; a micro line processing unit configured to extract a micro line corresponding to a region of pieces of adjacent pixel data binarized by the binarization processor which have the same value of black or white; a scale calculating unit configured to calculate a value of a micro line belonging to a main parameter and a sub parameter based on main parameters determined as a vertical line, a horizontal line, a slanted vertical line, a curve, and a circle and sub parameters subdivided as a horizontal line on the slanted vertical line, a horizontal line under the slanted vertical line, a curve on the slanted vertical line, a curve under the slanted vertical line, a circle on the slanted vertical line, or a circle under the slanted vertical line with respect to the slanted vertical line in the main parameters to extract a feature element that distinguishes numbers 0 to 9 from each other; a number recognizing unit configured to determine a number in the image of the vehicle license plate from the value belonging to the main parameter and the sub parameter calculated by the standard calculator.

However, in a conventional license plate recognition method, characteristics of characters according to a specific condition of a vehicle license plate are rarely used, and even when the license plate type information processed in the character separation is incorrect, a recognition result is output, thus leading to a misreading. When the misread result is used as it is, processing costs for correcting the misread result are higher than a cost for a rejection processing that does not output a result.

In order to reduce misreading, a method of increasing reliability of a recognizer may be used, but this method has a trade-off of lower throughput for higher reliability. That is, when reliability is increased, the recognition rate is lowered due to an increase in the number of representatives to be processed. Meanwhile, when the character separation process outputs erroneous type information of a license plate at a higher accuracy, a result of recognition is accordingly misprocessed, and incorrect license plate information is output (misread). Such an output of incorrect license plate information may result in higher costs than the cost required for a rejection that does not output a recognition result.

SUMMARY OF THE INVENTION

The present invention is directed to providing a system and method for recognizing vehicle license plate information on the basis of a structural characteristic of the vehicle license plate, the system and method are capable of improving accuracy in recognizing a license plate and reducing risk and cost associated with a misreading.

The technical objectives of the inventive concept are not limited to the above disclosure, and other objectives may become apparent to those of ordinary skill in the art based on the following descriptions.

To achieve the above-described objectives, a vehicle license plate information recognition system according to the present invention includes a license plate detecting module configured to detect a position of a license plate from a vehicle image obtained by imaging a vehicle; a character separation module configured to extract individual character images by separating a plurality of characters from a region of the detected license plate in the vehicle image, and extract a license plate type of the license plate according to a predetermined criterion; a character recognition module configured to recognize a license plate character string on the basis of the extracted individual character images and the license plate type; and a license plate information output module configured to output the recognized license plate character string; wherein the character recognition module recognizes a usage character in the individual character images through type-specific character recognition and universal character recognition, which each employ different classification criteria, and perform one of a process of generating a license plate character string, a process of reexamining a license plate type with respect to an individual character image, and a process of rejecting a result of a character recognition with respect to an individual character image on the basis of a result of comparing usage characters recognized through the type-specific character recognition and the universal character recognition with each other.

A method for recognizing vehicle license plate information through a vehicle license plate information recognition system includes: detecting a position of a license plate from a vehicle image obtained by imaging a vehicle; extracting individual character images by separating a plurality of characters from a region of the detected license plate in the vehicle image, and extracting a license plate type of the license plate according to a predetermined criterion; recognizing a license plate character string on the basis of the extracted individual character images and the license plate type; and outputting the recognized license plate character string, wherein the recognizing of the license plate character string may include recognizing a usage character in the individual character images through type-specific character recognition and universal character recognition, which each employ different classification criteria, and performing one of a process of generating a license plate character string, a process of reexamining a license plate type with respect to an individual character image, and a process of rejecting a result of a character recognition with respect to an individual character image on the basis of a result of comparing usage characters recognized through the type-specific character recognition and the universal character recognition with each other.

A vehicle license plate information recognition system includes a type-specific character recognizer configured to recognize a type-specific usage character on the basis of an individual character image of a license plate in an image obtained by imaging a vehicle and a license plate type of the license plate and a universal character recognizer configured to recognize a usage character on the basis of the individual character image, wherein the usage character is recognized by employing a classification criterion that is different from a classification criterion of the type-specific character recognizer and is a high level criterion including the classification criterion of the type-specific character recognizer, wherein one of a process of generating a license plate character string, a process of reexamining a license plate type with respect to an individual character image, and a process of rejecting a result of character recognition with respect to an individual character image may be performed on the basis of a result of comparing usage characters recognized through the type-specific character recognizer and the universal character recognizer with each other.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, exemplary embodiments of the present invention will be described in detail with reference to the accompanying drawings so that those skilled in the art may easily carry out the present invention. The present invention may be embodied in various ways and is not to be construed as limited to the embodiments set forth herein.

In the drawings, parts irrelevant to the description have been omitted for the clarity of explanation, and the same reference numerals are used to designate the same elements through the whole specification. In the following description, elements denoted with the same terms may be represented by different reference numerals between drawings. The reference numerals are merely for the convenience of description, and the concepts, features, functions, or effects of each part are not to be construed as limited by the corresponding numerals.

Through the specification, the term "connected to" or "coupled to" used to designate a connection or coupling of one element to another element includes both a case in which the element is "directly connected to" or "directly coupled to" the other element and a case in which the element is "electronically connected to" or "electronically coupled to" the other element via another element.

The term "comprises" or "includes" and/or "comprising" or "including" means that one or more other components, steps, operation and/or existence or addition of elements are not excluded in addition to the described components, steps, operation and/or elements unless context dictates otherwise.

In the specification, the term "part" or "module" refers to a unit that may be realized by hardware or software, a unit that may be realized using hardware and software, a unit that may be realized by two or more pieces of hardware as one unit, and a unit that may be realized by two or more units as one piece of hardware.

Hereinafter, a system and method for recognizing vehicle license plate information according to one embodiment of the present invention will be described in detail with reference to the accompanying drawings.

A vehicle license plate information recognition system from a general vehicle image will be illustrated as an example to which the present invention is applied.

Figure 1:
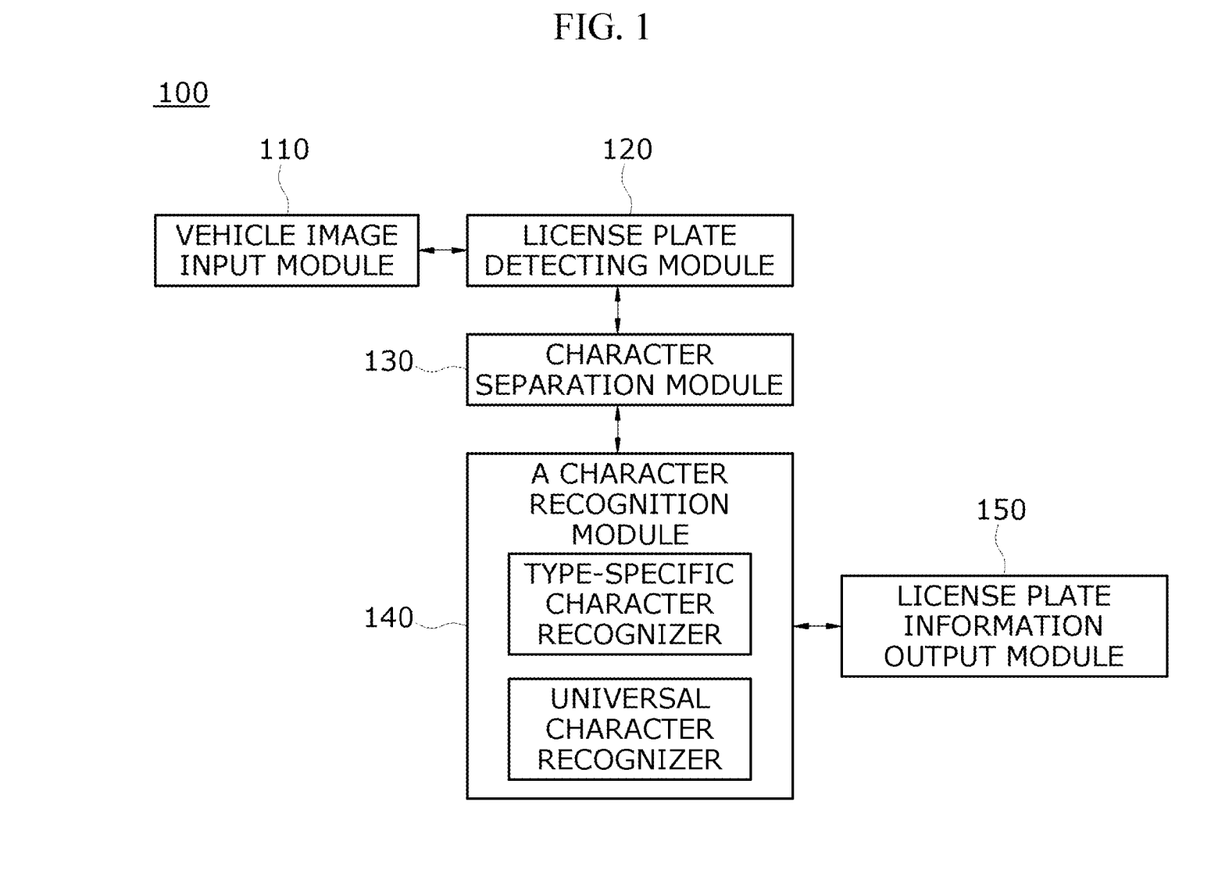
FIG. 1 is a diagram illustrating a configuration of a vehicle license plate information recognition system according to one embodiment of the present invention.

FIG. 1 is a diagram illustrating a configuration of a vehicle license plate information recognition system 100 according to one embodiment of the present invention.

Referring to FIG. 1, the vehicle license plate information recognition system 100 according to one embodiment of the present invention includes a vehicle image input module 110, a license plate detecting module 120, a character separation module 130, a character recognition module 140, and a license plate information output module 150. Also, the character recognition module 140 includes a type-specific character recognizer and a universal character recognizer.

The vehicle image input module 110 inputs a plurality of vehicle images that require vehicle license plate recognition into the license plate detecting module 120. For reference, the vehicle image is an image of a vehicle captured in various circumstances, such as while driving, stopped, and parked. The vehicle image input module 110 may additionally extract an image captured of at least one of a front side and rear side of the vehicle, and store or provide the extracted image.

In this case, the vehicle image input module 110 may sequentially input vehicle images that are previously stored in an additional memory (not shown), and may process vehicle images that are collected in real time through an external device (for example, a speed measuring device). For the vehicle image to be processed by the vehicle image input module 110, the type of vehicle image, a purpose of providing the vehicle image, and a method of collecting the vehicle image are not limited.

The license plate detecting module 120 detects a position of a license plate of a vehicle in a vehicle image by analyzing the input vehicle image through a predetermined image processing method. In this case, the license plate detecting module 120 may detect the position of the license plate by analyzing a target region that satisfies a predetermined condition or a region of interest (ROI) that is previously set, and the type and number of the image processing methods are not limited.

The character separation module 130 extracts individual characters in a region of the license plate of the vehicle image and a license plate type on the basis of the position of the license plate detected through the license plate detecting module 120.

In this case, the character separation module 130 extracts the individual characters and the license plate type by performing segmentation on the region of the license plate through analysis, such as a predetermined image processing method (e.g., histogram smoothing, vertical/horizontal projection, template, binarization), and the types and number of the image processing methods are not limited. For example, the character separation module 130 may perform a morphology process of removing noise and extracting contour lines of individual character images according to a size and shape of components of the individual characters.

The character separation module 130 provides the character recognition module 140 with license plate type information and the extracted individual character images.

The character recognition module 140 recognizes a license plate character string on the basis of the individual character images and the license plate type.

In this case, the character recognition module 140 recognizes a usage character in the individual character images through type-specific character recognition and universal character recognition to which different classification criteria are applied, and performs one of a process of generating a license plate character string, a process of reexamining the license plate type with respect to the individual character image, and a process of rejecting a character recognition result with respect to the individual character image on the basis of a result of comparing the usage characters recognized through the type-specific character recognition and the universal character recognition.

The character recognition and license plate character plate character string generation of the character recognition module 140 will be described in detail with reference to FIGS. 2 and 3.

The license plate information output module 150 provides a license plate character string that has been subjected to character recognition by the character recognition module 140.

Figure 2:
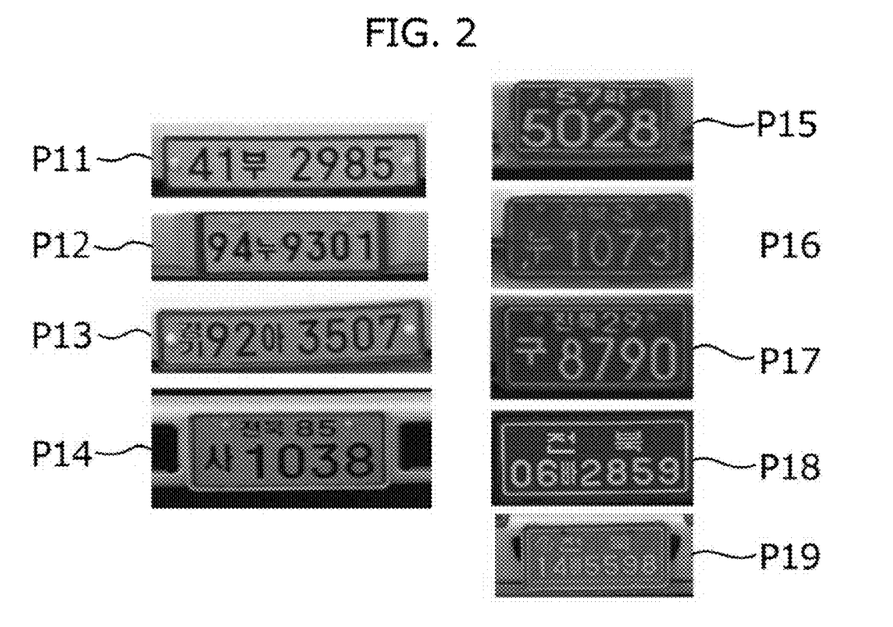
FIG. 2 is a diagram illustrating vehicle license plate types according to one embodiment of the present invention.
Figure 3:
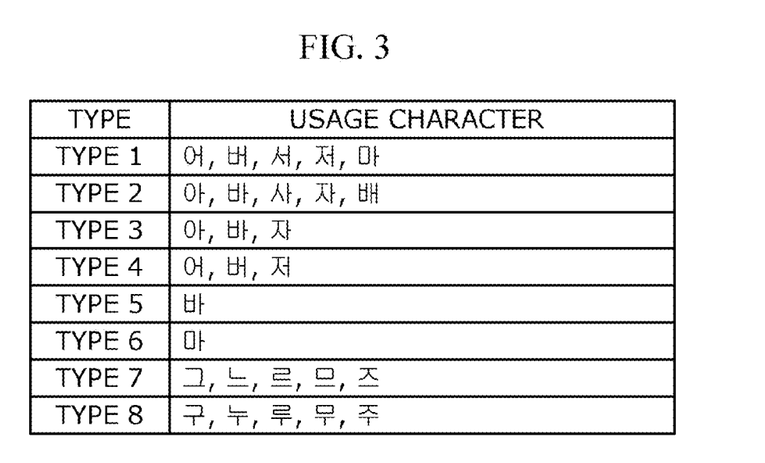
FIG. 3 is a diagram illustrating usage characters by type according to one embodiment of the present invention; and FIG. 4A

FIG. 2 is a diagram illustrating vehicle license plate types according to an exemplary embodiment of the present invention, and FIG. 3 is a diagram illustrating usage characters by type according to one embodiment of the present invention.

In detail, the character recognition module 140 inputs individual character images and license plate type information into a type-specific character recognizer, and inputs the individual character images into a universal character recognizer.

The type-specific character recognizer recognizes a character in the individual character image on the basis of the license plate type. As this is to use characteristics of a vehicle license plate that is a target of character recognition, vehicle license plates are divided into a plurality of types, and classification criteria vary between each license plate type.

For example, vehicle license plates may be divided on the basis of a difference of background brightness and character brightness, the type and color of a usage character, a background color, and a combination of a character and a number.

Classification criteria according to such a structural characteristic of the vehicle license plate are described in detail with reference to FIGS. 2 and 3.

First, referring to FIG. 2, nine vehicle license plate types are illustrated. In the nine vehicle license plate types, characters used for a usage (that is, usage character) are different from each other. Also, the nine vehicle license plate types have different sizes, different types of characters, different color combinations of a background and a character, and different background colors.

Although the vehicle license plate types are divided into nine types in FIG. 2, the types may be variously classified according to a classification criterion for dividing types.

For example, when the license plate types are divided on the basis of the difference between background brightness and character brightness, first to fourth license plates P11 to P14 are identified as a type with a character darker than a background, and fifth to ninth license plates P15 to P19 are identified as a type with a character brighter than a background. That is, the license plates may be divided into two types.

When the license plate types are divided on the basis of a similarity of a usage character (written in Korean), the first and second license plates P11 and P12 are identified as a type with a property "white general", the third and fourth license plates P13 and P14 are identified as a type with a property "yellow transportation", the fifth to seventh license plates P15 to P17 are identified as a type with a property "green general", and the eighth and ninth license plates P18 and P19 are identified as a type with a property "construction". That is, the license plates may be divided into four types.

Meanwhile, the usage character of the vehicle license plate may be set according to a different criterion depending on various conditions, such as a time at which the license plate was generated, a usage for which the vehicle is used, and a location at which the vehicle is registered.

For example, referring to FIG. 3, the number and types of characters used as a usage character may be divided into eight types.

Referring to FIG. 3, a usage character of "어," "버," "서," "저," and "마" is set as a first type, a usage character of "아," "바," "사," "자," and "배" is set as a second type, a usage character of "아," "바," and "자" is set as a third type, a usage character of "어," "버," and "저" is set as a fourth type, a usage character of "바" is set as a fifth type, a usage character of "마" is set as a sixth type, a usage character of "그," "느," "르," "므," and "즈" is set as a seventh type, and a usage character of "구," "누," "루," "무," and "주" is set as an eight type. According to one embodiment of the present invention, the usage character is set in the form of Korean, but the usage character may be provided using the English alphabet, and is not limited to a certain type.

That is, according to one embodiment of the present invention, a structural characteristic in which a character to be recognized is a vehicle license plate character is used. Among characters in a vehicle license plate, a usage character is the most distinct feature among different types of vehicle license plates. Accordingly, the character recognition module 140 compares whether results of a usage character recognized through each of the type-specific character recognition and the universal character recognition are identical to each other.

The type-specific character recognizer recognizes a type-specific usage character on the basis of the individual character image of the license plate and the license plate type information. The universal character recognizer recognizes a usage character on the basis of the individual character image, but recognizes the usage character by employing a different classification criterion from a classification criterion of the type-specific character recognizer, and is a high level criterion including the classification criterion of the type-specific character recognizer.

As such, the type-specific character recognizer and the universal character recognizer of the character recognition module 140 recognize characters by each employing different classification criteria such that the universal character recognizer employs a high level classification criterion broader than the classification criterion of the type-specific character recognizer. For example, the universal character recognizer may generate two classifications on the basis of a difference between background brightness and character brightness, and the type-specific character recognizer may generate four classifications on the basis of a similarity of a usage character in Korean. That is, the criterion for classifying types of license plates in the universal character recognizer may be a higher level concept than the criterion for classifying types of license plates in the type-specific character recognizer. The universal character recognizer serves to reduce a misreading rate, and the type-specific character recognizer serves to maintain high reliability.

The character recognition module 140 is configured to, when results of recognition of a usage character in the individual character images of the license plate by the type-specific character recognizer and the universal character recognizer are identical to each other, generate and output a license plate character string in a case in which results of recognition of the remaining individual character images except for the usage character are identical to each other or have a similarity of a predetermined threshold value or more, and reject the result of recognition of the individual character image in a case in which the results of recognition of the remaining individual character images have a similarity less than the predetermined threshold value.

Also, the character recognition module 140 is configured to, when results of recognition of a usage character in the individual character images of the license plate by the type-specific character recognizer and the universal character recognizer are different from each other, re-perform a character recognition by reexamining the license plate type in a case in which the results of recognition of the usage character have a similarity of the predetermined threshold value or more, and reject the result of recognition of the individual character image when the results of recognition of the usage character have a similarity less than the predetermined threshold value.

For example, referring to FIG. 2, types of the second license plate and the third license plate P12 and P13 may cause confusion in the character separation module 130, and the third license plate P13 may be misread as the second license plate P12. For reference, a license plate type, such as the third license plate P13. only uses the usage characters "아," "바," "사," "자," and "배," whereas the usage characters "아," "바," "사," "자," and "배" are not used in the second license plate P12. However, the characters "어," "버," "서," "저," and "마" or similar to those used in the third license plate P13 are used as a usage character according to the second license plate P12, and it may be determined that an error in the license plate type has occurred when a similar pattern is found in the process of comparing usage characters.

When the usage characters are similar to each other, the license plate type may be reexamined depending on a degree of matching of the result of remaining recognition.

For example, referring to FIG. 3, when the character separation module 130 outputs the license plate type as the first type, a usage character may be respectively recognized as "어" and "아" by the type-specific character recognizer and the universal character recognizer. In this case, when results of recognition of the remaining characters (e.g., numbers) are identical to each other, it may be determined that the character separation module 130 has erroneously determined the second type to be the first type. Accordingly, a license plate type reexamination process is performed so that the license plate type is modified to the first type, and the character recognition process is performed again.

As such, in consideration of the fact that the universal character recognizer processes a larger number of usage characters than the type-specific usage recognizer, a final result (a license plate character string) is output on the basis of a result of comparing usage characters recognized in the two recognizers and a result of comparing the remaining individual character images recognized in the two recognizers so that a reduced misreading rate and increased reliability may be obtained. Also, for similar types that have no overlapping usage characters between the two recognizers, an error of the character separation module 130 may be corrected. Also, a trade-off relation of throughput and reliability that occurs due to the use of character recognition (e.g., type-specific recognition) according to a single classification criterion may be improved.

Meanwhile, the vehicle license plate information recognition system according to one embodiment of the present invention includes a communication module (not shown), a memory (not shown), and a processor (not shown) to operate each component shown in FIG. 1.

In this case, the communication module may include a wired communication module and a wireless communication module. The wired communication module may be implemented with a power line communication device, a telephone line communication device, a cable home (a multimedia over coaxial alliance (MoCA)), Ethernet, IEEE1294, an integration wired home network, an RS-485 control device, and/or the like. Also, the wireless communication module may be implemented with a wireless local area network (WLAN), Bluetooth, a high-data-rate wireless personal area network (HDR WPAN), ultra-wideband (UWB), Zigbee, impulse radio, 60 GHz WPAN, binary-CDMA, wireless Universal Serial Bus (USB) technology, wireless high-definition multimedia interface (HDMI) technology, and/or the like.

The memory may store programs for respectively operating the elements, and the processor may execute the programs. Here, the memory may be a generic name for a volatile memory and a nonvolatile memory that continuously maintains stored information even when power is supplied thereto.

For example, examples of the memory may include NAND flash memory such as a compact flash (CF) card, a secure digital (SD) card, a memory stick, a solid state drive (SSD), and a micro SD card, a magnetic computer memory device such as a hard disk drive (HDD), and an optical disk drive such as a compact disc read only memory (CD-ROM) and a digital versatile disc (DVD)-ROM.

Moreover, the programs stored in the memory may each be implemented in the form of software or in the form of hardware such as a field-programmable gate array (FPGA) or an application-specific integrated circuit (ASIC) and may perform certain functions.

For reference, the elements according to one embodiment of the present invention illustrated in FIG. 1 may each be implemented in the form of software or in the form of hardware such as an FPGA or an ASIC and may perform certain functions.

However, the elements are not limited to software or hardware in meaning. In other embodiments, each of the elements may be configured to be stored in a storage medium capable of being addressed, or may be configured to execute one or more processors.

Therefore, for example, the elements may include elements such as software elements, object-oriented software elements, class elements, and task elements, processes, functions, attributes, procedures, subroutines, segments of a program code, drivers, firmware, microcode, circuits, data, databases, data structures, tables, arrays, and variables.

Elements and a function provided in corresponding elements may be combined into fewer elements or may be further divided into additional elements.

Hereinafter, a method of recognizing vehicle license plate information through the vehicle license plate information recognition system 100 will be described with reference to FIG. 4A and FIG. 4B in detail.

Figure 4A:
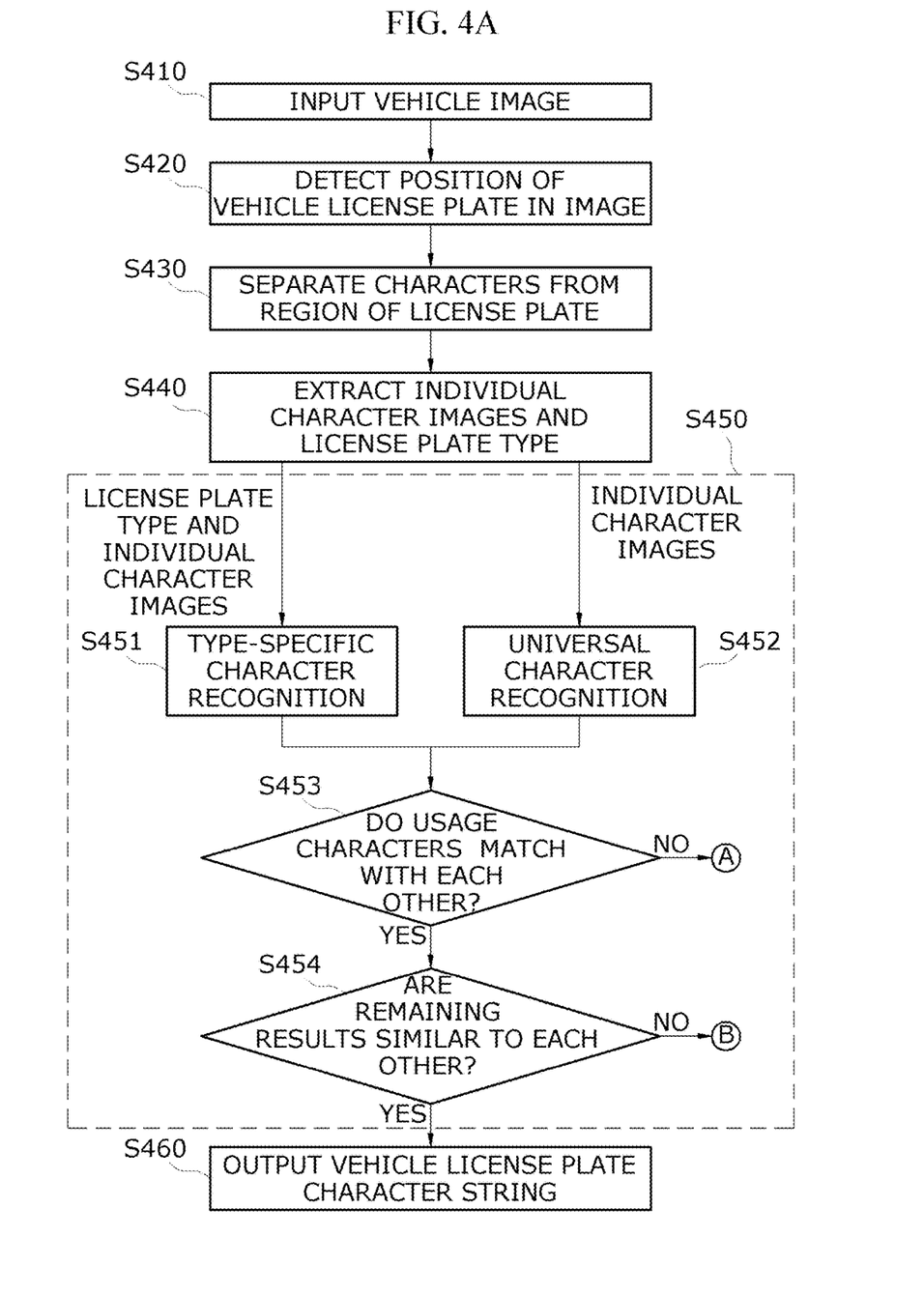
Figure 4B:
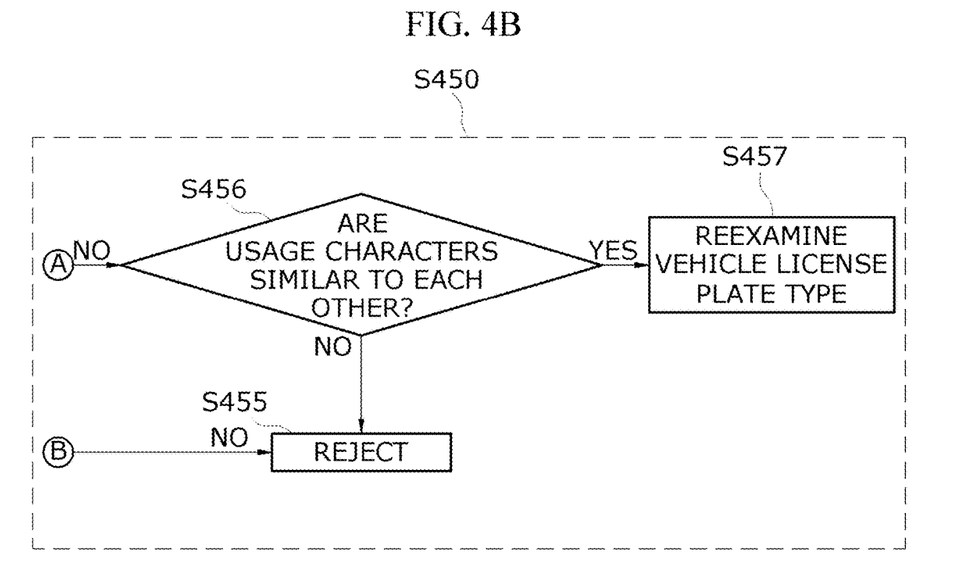
FIG. 4B is a flowchart showing a method of recognizing vehicle license plate information according to one embodiment of the present invention.

FIG. 4A and FIG. 4B is a flowchart showing a method of recognizing vehicle license plate information according to one embodiment of the present invention.

First, when a vehicle image obtained by imaging a vehicle is input (S410), a position of a license plate in the vehicle image is detected through a predetermined image processing (S420).

Then, a plurality of license plate characters included in a region of the detected license plate are individually separated (S430).

Individual character images for the respective characters are extracted through the separation process, and a license plate type is extracted on the basis of a predetermined criterion (S440).

Then, a license plate character string is recognized on the basis of the extracted individual character images and the license plate type (S450).

The recognizing of the license plate character string (S450) includes the following operations. First, type-specific character recognition is performed on the basis of the license plate type and the individual character image (S451), and universal character recognition is performed on the basis of the individual character image (S452).

Type-classification criteria for processing recognition differ between the type-specific character recognition and the universal character recognition. The classification criterion of the universal character recognition adopts a higher level concept than the classification criterion of the type-specific character recognition. Then, results of usage character recognition through the type-specific character recognition and the universal character recognition are compared with each other, and it is determined whether results of the usage character recognized through the respective recognitions are identical to each other (S453).

When the usage characters respectively obtained through the recognitions are identical to each other, it is determined whether results of recognition of the remaining individual characters in the individual character images through the type-specific character recognition and the universal character recognition are identical to each other or similar to each other with a similarity of a predetermined threshold value or more (S454).

When it is determined in operation S454 that the remaining individual characters are identical or similar to each other, a license plate character string recognized through the individual character images is generated and output (S460).

When it is determined in operation S454 that the remaining individual characters are different from each other, the result of the character recognition for the individual character image is rejected (S455).

Meanwhile, when it is determined in operation S453 that the usage characters recognized through each of the recognitions are not identical to each other, it is determined whether the usage characters obtained through the recognitions have a similarity of a predetermined threshold value or more (S456).

When it is determined in operation S456 that the usage characters obtained through the respective recognitions are similar to each other, reexamination of the license plate type is performed on the license plate (S457).

When it is determined in operation S456 that the usage characters obtained through the recognitions are different from each other, the result of the character recognition for the individual character image is rejected (S455).

The recognition method using the vehicle license plate information recognition system 100 according to one embodiment of the present invention described above may be implemented in the form of a computer program stored in a medium executed by a computer or a recording medium including instructions executable by a computer. Computer-readable media may be any available media that may be accessed by a computer, and includes both volatile and nonvolatile media and removable and non-removable media. The computer-readable medium may also include both computer storage media and communication media. The computer storage media includes volatile, nonvolatile, removable, and non-removable media implemented in any method or technology for storing information such as computer readable instructions, data structures, program modules or other data. The communication media typically includes computer readable instructions, data structures, program modules, or other data in a modulated data signal, such as a carrier wave, or other transport mechanism, and any information delivery media.

Although the method and system according to the present invention have been described in relation to embodiments, some or all of those elements or operations may be implemented using a computer system having a general purpose hardware architecture.

As is apparent from the above, a recognition rate can be improved by recognizing a vehicle license plate through two or more recognizers adopting different character recognition methods so that structural characteristics for each license plate type are accurately recognized.

Also, a risk and cost associated with recognition can be reduced by discarding a misread result of a license plate type caused by an error in character separation.

Also, the recognition performance of a license plate can be significantly improved in comparison to a vehicle license plate recognition technology that adopts a conventional character separation method by using a characteristic of a usage character on a license plate, which is a structural characteristic, according to the vehicle license plate type.

The exemplary embodiments of the present invention are illustrative in purpose, and those skilled in the art should appreciate that various modifications, changes, and substitutions thereto are possible without departing from the scope and spirit of the invention. Therefore, the exemplary embodiments disclosed in the present invention and the accompanying drawings are intended to illustrate and not limit the technical spirit of the present invention. For example, each element described as a single entity may be implemented in a distributed form, and elements described as being distributed may be implemented in a combined form.

The scope of the invention it set forth in the following claims rather than the above specification, and it is intended that the present invention covers all modifications provided they come within the scope of the appended claims and their equivalents.

What is claimed is:

1. A vehicle license plate information recognition system comprising:
    a license plate detecting module configured to detect a position of a license plate from a vehicle image obtained by imaging a vehicle;
    a character separation module configured to separate a plurality of characters from a region of the detected license plate in the vehicle image, extract individual character images, and extract a license plate type of the license plate according to a predetermined criterion;
    a character recognition module configured to recognize a license plate character string on the basis of the extracted individual character images and the license plate type; and
    a license plate information output module configured to output the recognized license plate character string,
    wherein the character recognition module recognizes a usage character in the individual character images through type-specific character recognition and universal character recognition, which each employ different classification criteria, the usage character corresponding to at least one of a time at which the license plate was generated, a location at which the vehicle is registered, and a usage for which the vehicle is used,
    wherein the type-specific character recognition recognizes the usage character using both an individual character image and type information regarding the license plate type,
    wherein the universal character recognition recognizes the usage character using the individual character image without using the type information,
    wherein the character recognition module compares a result of the type-specific character recognition and the universal character recognition, and
    wherein the character recognition module performs, based on a result of the comparison, one of a process of generating a license plate character string, a process of reexamining a license plate type with respect to an individual character image, and a process of rejecting a result of a character recognition with respect to an individual character image.

2. The system of claim 1, wherein the character recognition module comprises:
    a type-specific character recognizer configured to recognize a type-specific usage character on the basis of the individual character image of the license plate and the license plate type information; and
    an universal character recognizer configured to recognize a usage character on the basis of the individual character image, wherein the usage character is recognized by employing a classification criterion that is different from a classification criterion of the type-specific character recognizer and is a high level criterion including the classification criterion of the type-specific character recognizer.

3. The system of claim 2, wherein:
    the character recognition module is configured to, when results of the usage character recognition in the individual character images of the license plate by the type-specific character recognizer and the universal character recognizer are identical to each other;
    generate and output the license plate character string in a case in which results of recognition of the remaining individual character images except for the usage character are identical to each other or similar to each other with a similarity of a predetermined threshold value or more; and
    reject results of recognition of the individual character image in a case in which the results of recognition of the remaining individual character images have a similarity less than the predetermined threshold value.

4. The system of claim 2, wherein:
    the character recognition module is configured to, when results of the usage character recognition in the individual character images of the license plate by the type-specific character recognizer and the universal character recognizer are different from each other;
    re-perform a character recognition by reexamining the license plate type in a case in which the results of the usage character recognition have a similarity of a predetermined threshold value or more; and reject a result of the individual character image in a case in which the results of the usage character recognition have a similarity less than the predetermined threshold value.

5. The system of claim 1, wherein the classification criteria for the license plate type includes at least one of a size of a license plate, a type of a usage character, a combination of a background color and a character color, and a difference between background brightness and character brightness.

6. A method for recognizing vehicle license plate information through a vehicle license plate information recognition system, the method comprising:
   detecting a position of a license plate from a vehicle image obtained by imaging a vehicle;
   separating a plurality of characters from a region of the detected license plate in the vehicle image, extracting individual character images, and extracting a license plate type of the license plate according to a predetermined criterion;
   recognizing a license plate character string on the basis of the extracted individual character images and the license plate type; and
   outputting the recognized license plate character string,
   wherein the recognizing of the license plate character string comprises recognizing a usage character in the individual character images through type-specific character recognition and universal character recognition, which each employ different classification criteria, the usage character corresponding to at least one of a time at which the license plate was generated, a location at which the vehicle is registered, and a usage for which the vehicle is used,
   wherein recognizing the usage character through the type-specific character recognition includes using both an individual character image and type information regarding the license plate type,
   wherein recognizing the usage character through the universal character recognition includes using the individual character image without using the type information, and
   wherein the recognizing of the license plate character string further comprises comparing a result of the type-specific character recognition and the universal character recognition and performing, based on a result of the comparison, one of a process of generating a license plate character string, a process of reexamining a license plate type with respect to an individual character image, and a process of rejecting a result of a character recognition with respect to an individual character image.

7. The method of claim 6, wherein the recognizing of the license plate character string comprises:
   performing the type-specific character recognition in which a type-specific usage character is recognized on the basis of the individual character image of the license plate and the license plate type information;
   performing a usage character recognition of recognizing a usage character on the basis of the individual character image, wherein the usage character is recognized by employing a classification criterion that is different from a classification criterion of the type-specific character recognition and is a high level criterion including the classification criterion of the type-specific character recognition; and
   performing one of the process of generating a license plate character string, the process of reexamining a license plate, and the process of rejecting a character recognition result on the basis of the result of comparing the usage characters recognized through the type-specific character recognition and the universal character recognition with each other.

8. The method of claim 7, wherein the recognizing of the license plate character string comprises, when results of the usage character recognition in the individual character images of the license plate by the type-specific character recognition and the universal character recognition are identical to each other,
   generating and outputting a license plate character string in a case in which results of recognition of the remaining individual character images except for the usage character are identical to each other or similar to each other with a similarity of a predetermined threshold value or more, and
   rejecting results of recognition of the individual character image in a case in which the results of recognition of the remaining individual character images have a similarity less than the predetermined threshold value.

9. The method of claim 7, wherein the recognizing of the license plate character string comprises, when results of the usage character recognition in the individual character images of the license plate by the type-specific character recognition and the universal character recognition are different from each other,
   reexamining the license plate type and re-performing a character recognition in a case in which the results of the usage character recognition have a similarity of a predetermined threshold value or more, and
   rejecting a result of recognition of the individual character image in a case in which the results of the usage character recognition have a similarity less than the predetermined threshold value.

10. The method of claim 6, wherein the classification criteria of the license plate type includes at least one of a size of a license plate, a type of a usage character, a combination of a background color and a character color, and a difference between background brightness and character brightness.

11. A vehicle license plate information recognition system comprising:
   a type-specific character recognizer configured to recognize a type-specific usage character on the basis of an individual character image of a license plate in an image obtained by imaging a vehicle and a license plate type of the license plate; and
   a universal character recognizer configured to recognize a usage character on the basis of the individual character image, wherein the usage character is recognized by employing a classification criterion that is different from a classification criterion of the type-specific character recognizer and is a high level criterion including the classification criterion of the type-specific character recognizer,
   wherein one of a process of generating a license plate character string, a process of reexamining a license plate type with respect to an individual character image, and a process of rejecting a result of character recognition with respect to an individual character image is performed on the basis of a result of comparing usage characters recognized through the type-specific character recognizer and the universal character recognizer with each other.

12. The system of claim 11, wherein, when results of the usage character recognition in the individual character images of the license plate by the type-specific character recognizer and the universal character recognizer are identical to each other,
- a license plate character string is generated and output in a case in which results of recognition of the remaining individual character images except for the usage character are identical to each other or similar to each other with a similarity of a predetermined threshold value or more, and
- a result of recognition of the individual character image is rejected in a case in which the results of recognition of the remaining individual character images have a similarity less than the predetermined threshold value.

13. The system of claim 11, wherein, when results of the usage character recognition in the individual character images of the license plate by the type-specific character recognizer and the universal character recognizer are different from each other,
- character recognition is re-performed by reexamining the license plate type in a case in which the results of the usage character recognition have a similarity of a predetermined threshold value or more, and
- a result of recognition of the individual character image is rejected in a case in which the results of the usage character recognition have a similarity less than the predetermined threshold value.

* * * * *